United States Patent
Davis et al.

(10) Patent No.: US 7,668,873 B2
(45) Date of Patent: *Feb. 23, 2010

(54) DATA STORE FOR SOFTWARE APPLICATION DOCUMENTS

(75) Inventors: Tristan A. Davis, Redmond, WA (US); Ali Taleghani, Redmond, WA (US); Marcin Sawicki, Kirkland, WA (US); Robert A. Little, Redmond, WA (US); Brian M. Jones, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 192 days.

This patent is subject to a terminal disclaimer.

(21) Appl. No.: 11/066,117

(22) Filed: Feb. 25, 2005

(65) Prior Publication Data

US 2006/0195777 A1    Aug. 31, 2006

(51) Int. Cl.
*G06F 12/00* (2006.01)
*G06F 17/30* (2006.01)
(52) U.S. Cl. .................... 707/201; 707/102; 715/234; 715/248
(58) Field of Classification Search .................. 707/6
See application file for complete search history.

(56) References Cited

U.S. PATENT DOCUMENTS

| | | |
|---|---|---|
| 5,287,504 A | 2/1994 | Carpenter et al. |
| 5,440,745 A | 8/1995 | Platte et al. |
| 5,630,131 A | 5/1997 | Palevich et al. |
| 5,715,415 A | 2/1998 | Dazey et al. |
| 5,717,741 A | 2/1998 | Yue et al. |
| 5,845,299 A | 12/1998 | Arora et al. |
| 5,903,902 A | 5/1999 | Orr et al. |

(Continued)

FOREIGN PATENT DOCUMENTS

KR    2004-0020933 A    3/2004

(Continued)

OTHER PUBLICATIONS

Leslie, "Using Javadoc and XML to Produce API Reference Documentation", SIGDOC' 02, Oct. 23, 2002, ACM Press, p. 104-109.*

(Continued)

*Primary Examiner*—Hosain T Alam
*Assistant Examiner*—Shew-Fen Lin
(74) *Attorney, Agent, or Firm*—Merchant & Gould; Ryan T. Grace (57) ABSTRACT

A data store is provided for storing, relating and for allowing use of data associated with a computer-generated document. Data for structuring information associated with a document, such as document metadata, is maintained in the data store where relationships between different pieces of data are maintained in a location distinct from the surface level view of a document. The data store exposes interfaces to the various pieces of data in the data store for allowing different applications to access and operate on one or more of the data pieces. The pieces of data may be structured according to a markup language such as the Extensible Markup Language (XML), and XML schemas may be associated with each piece of data for allowing the data store to validate the structure applied to the data based on an XML schema associated with a given piece of data.

18 Claims, 2 Drawing Sheets

U.S. PATENT DOCUMENTS

| | | | |
|---|---|---|---|
| 5,910,075 A | 6/1999 | Arnell et al. | 49/25 |
| 5,911,068 A | 6/1999 | Zimmerman et al. | 719/328 |
| 5,974,430 A | 10/1999 | Mutschler et al. | 715/505 |
| 5,991,878 A | 11/1999 | McDonough et al. | 726/9 |
| 6,006,239 A | 12/1999 | Bhansali et al. | |
| 6,014,677 A | 1/2000 | Hayashi et al. | 707/104.1 |
| 6,088,431 A | 7/2000 | LaDue | |
| 6,157,940 A | 12/2000 | Marullo et al. | |
| 6,247,020 B1 | 6/2001 | Minard | |
| 6,268,851 B1 | 7/2001 | Bricklin et al. | |
| 6,275,824 B1 | 8/2001 | O'Flaherty et al. | 707/9 |
| 6,317,777 B1 | 11/2001 | Skarbo et al. | |
| 6,397,351 B1 | 5/2002 | Miller et al. | |
| 6,457,002 B1 | 9/2002 | Beattie et al. | 707/3 |
| 6,490,601 B1 | 12/2002 | Markus et al. | 715/507 |
| 6,507,856 B1* | 1/2003 | Chen et al. | 715/205 |
| 6,562,076 B2 | 5/2003 | Edwards et al. | |
| 6,571,253 B1 | 5/2003 | Thompson et al. | 707/103 R |
| 6,629,843 B1 | 10/2003 | Bunting et al. | 434/118 |
| 6,731,314 B1* | 5/2004 | Cheng et al. | 715/848 |
| 6,859,821 B1 | 2/2005 | Ozzie et al. | |
| 6,865,599 B2* | 3/2005 | Zhang | 709/218 |
| 6,920,455 B1 | 7/2005 | Weschler | 707/100 |
| 6,944,622 B1 | 9/2005 | Mitchell et al. | |
| 6,944,662 B2 | 9/2005 | Devine et al. | |
| 6,950,990 B2 | 9/2005 | Rajarajan et al. | |
| 6,996,769 B1 | 2/2006 | Peikes et al. | |
| 7,017,112 B2 | 3/2006 | Collie et al. | 715/513 |
| 7,035,839 B1 | 4/2006 | Gillespie et al. | |
| 7,039,708 B1 | 5/2006 | Knobl et al. | |
| 7,039,863 B1 | 5/2006 | Caro et al. | 715/530 |
| 7,085,773 B2 | 8/2006 | Dorsett, Jr. | |
| 7,111,284 B2 | 9/2006 | Takagi et al. | |
| 7,117,504 B2 | 10/2006 | Smith et al. | 719/328 |
| 7,200,816 B2 | 4/2007 | Falk et al. | |
| 7,237,002 B1 | 6/2007 | Estrada et al. | |
| 7,340,481 B1 | 3/2008 | Baer et al. | |
| 7,386,563 B1 | 6/2008 | Pal | |
| 7,509,305 B2 | 3/2009 | Tozawa et al. | |
| 2001/0056463 A1 | 12/2001 | Grady et al. | 709/203 |
| 2002/0010716 A1 | 1/2002 | McCartney et al. | 707/517 |
| 2002/0013792 A1 | 1/2002 | Imielinski et al. | |
| 2002/0065110 A1 | 5/2002 | Enns et al. | |
| 2002/0085020 A1 | 7/2002 | Carroll | |
| 2002/0107867 A1 | 8/2002 | Takagi et al. | |
| 2002/0133516 A1 | 9/2002 | Davis et al. | |
| 2002/0161801 A1 | 10/2002 | Hind et al. | |
| 2002/0198962 A1* | 12/2002 | Horn et al. | 709/218 |
| 2003/0007009 A1 | 1/2003 | Haley | 345/805 |
| 2003/0018666 A1 | 1/2003 | Chen et al. | |
| 2003/0018714 A1 | 1/2003 | Mikhailov et al. | |
| 2003/0023632 A1 | 1/2003 | Ries et al. | |
| 2003/0023953 A1 | 1/2003 | Lucassen et al. | |
| 2003/0051054 A1 | 3/2003 | Redlich et al. | 709/246 |
| 2003/0097457 A1* | 5/2003 | Saran et al. | 709/230 |
| 2003/0159111 A1 | 8/2003 | Fry | 715/513 |
| 2003/0163603 A1 | 8/2003 | Fry et al. | 709/328 |
| 2003/0164859 A1 | 9/2003 | Evans | |
| 2003/0174162 A1* | 9/2003 | Wu | 345/736 |
| 2004/0021679 A1 | 2/2004 | Chapman et al. | 345/700 |
| 2004/0073565 A1 | 4/2004 | Kaufman et al. | |
| 2004/0088332 A1* | 5/2004 | Lee et al. | 707/200 |
| 2004/0088647 A1 | 5/2004 | Miller et al. | |
| 2004/0103147 A1 | 5/2004 | Flesher et al. | |
| 2004/0111672 A1 | 6/2004 | Bowman et al. | |
| 2004/0153467 A1 | 8/2004 | Conover et al. | 707/100 |
| 2004/0183830 A1 | 9/2004 | Cody et al. | |
| 2004/0199876 A1 | 10/2004 | Ethier et al. | |
| 2004/0205565 A1 | 10/2004 | Gupta | |
| 2004/0205653 A1 | 10/2004 | Hadfield et al. | |
| 2004/0217985 A9 | 11/2004 | Ries et al. | 715/740 |
| 2004/0220926 A1* | 11/2004 | Lamkin et al. | 707/3 |
| 2004/0225958 A1 | 11/2004 | Halpert et al. | |
| 2004/0237036 A1 | 11/2004 | Quist et al. | |
| 2004/0243938 A1 | 12/2004 | Weise et al. | 715/526 |
| 2004/0268240 A1 | 12/2004 | Vincent | |
| 2005/0014494 A1 | 1/2005 | Owen et al. | |
| 2005/0027618 A1 | 2/2005 | Zucker et al. | 705/26 |
| 2005/0033667 A1 | 2/2005 | Sugimoto et al. | |
| 2005/0033766 A1 | 2/2005 | Pang et al. | |
| 2005/0034079 A1* | 2/2005 | Gunasekar et al. | 715/753 |
| 2005/0044145 A1* | 2/2005 | Quinn et al. | 709/205 |
| 2005/0050066 A1 | 3/2005 | Hughes | |
| 2005/0068913 A1 | 3/2005 | Tan et al. | |
| 2005/0071477 A1 | 3/2005 | Evans et al. | |
| 2005/0076295 A1 | 4/2005 | Simske et al. | 715/517 |
| 2005/0086384 A1 | 4/2005 | Ernst | 709/248 |
| 2005/0091346 A1* | 4/2005 | Krishnaswami et al. | 709/220 |
| 2005/0091576 A1 | 4/2005 | Relyea et al. | 715/502 |
| 2005/0114771 A1 | 5/2005 | Piehler et al. | |
| 2005/0154978 A1 | 7/2005 | Albornoz et al. | |
| 2005/0183001 A1 | 8/2005 | Carter et al. | 715/501.1 |
| 2005/0187973 A1 | 8/2005 | Brychell et al. | |
| 2005/0188349 A1 | 8/2005 | Bent et al. | 717/106 |
| 2005/0188350 A1 | 8/2005 | Bent et al. | 717/106 |
| 2005/0289457 A1 | 12/2005 | Obasanjo et al. | 715/513 |
| 2006/0031755 A1 | 2/2006 | Kashi | |
| 2006/0036692 A1* | 2/2006 | Morinigo et al. | 709/206 |
| 2006/0041558 A1 | 2/2006 | McCauley et al. | |
| 2006/0048112 A1 | 3/2006 | Thiagarajan et al. | |
| 2006/0053158 A1 | 3/2006 | Hall et al. | |
| 2006/0053194 A1* | 3/2006 | Schneider et al. | 709/204 |
| 2006/0069987 A1 | 3/2006 | Jones et al. | 715/520 |
| 2006/0069989 A1 | 3/2006 | Jones et al. | 715/526 |
| 2006/0080590 A1 | 4/2006 | Jones et al. | 715/500 |
| 2006/0136441 A1 | 6/2006 | Fujisaki | |
| 2006/0150085 A1 | 7/2006 | Davis et al. | 715/513 |
| 2006/0195413 A1 | 8/2006 | Davis et al. | |
| 2006/0195454 A1 | 8/2006 | Davis et al. | 707/100 |
| 2006/0195783 A1 | 8/2006 | Davis et al. | 715/513 |
| 2006/0282452 A1 | 12/2006 | Takagi et al. | |
| 2007/0061382 A1 | 3/2007 | Davis et al. | |
| 2007/0118554 A1* | 5/2007 | Chang et al. | 707/102 |

FOREIGN PATENT DOCUMENTS

| | | |
|---|---|---|
| KR | 2004-0034327 A | 4/2004 |
| WO | WO 01/08033 A2 | 2/2001 |
| WO | WO 01/08033 A3 | 2/2001 |
| WO | WO 01/11486 A2 | 2/2001 |
| WO | WO 01/11486 A3 | 2/2001 |
| WO | WO 01/15004 A2 | 3/2001 |
| WO | WO 01/95515 A2 | 12/2001 |
| WO | WO 01/95515 A3 | 12/2001 |

OTHER PUBLICATIONS

Sun et al., "Operational Transformation for Collaborative Word Processing", Proceedings of the Conference of CSCW'04, Nov. 10, 2004, ACM Press, p. 437-446.*

Sun_Micro, "How to Write Doc Comments for the Javadoc Tool", Sep. 2004, p. 1-16, <Retrieved from web.archive.org Oct. 4, 2008>.*

Sala et al, "ML 3.0 Smoothed Aggregation User's Guide", May 2004, Computational Math & Algorithms, Sandia Notional Laboratories, <Retrieved from http://trilinos.sandia.gov/packages/ml/publications.html on Oct. 3, 2008>.*

Memorandum and four figures regarding StarOffice 5.1; date is unknown, but believed to be earlier than Jan. 5, 2001, 5 pp.

Habralcen, Jr., StarOffice 5.2 Calc Handbook, Prentice Hall, Dec. 2000, Chapter 2, 5 pp.

Comai et al., "Computing Graphical Queries Over XML Data", ACM Transactions on Information Systems TOIS, Oct. 2001, ACM Press, vol. 19 No. 4, 371-430 pp.

Official Action in U.S. Appl. No. 10/955,612 dated Sep. 19, 2006.

Official Action in U.S. Appl. No. 11/030,423 dated Nov. 22, 2006.

Official Action in U.S. Appl. No. 11/030,423 dated May 15, 2007.
Official Action in U.S. Appl. No. 11/066,083 dated Jun. 4, 2007.
Official Action in U.S. Appl. No. 11/067,383 dated Jun. 28, 2007.
Official Action in U.S. Appl. No. 11/030,423 dated Oct. 4, 2007.
European Search Report dated Dec. 19, 2007 in EP 05112126.7.
European Search Report dated Dec. 19, 2007 in EP 05112131.7.
Altova, "xmlspy5: User & Reference Manual", Jan. 3, 2003, www.altova.com, pp. 13-30, 698-701, 890.
European Examination Report dated Jun. 12, 2008 in EP 05105427.8.
European Examination Report dated Mar. 3, 2008 in EP 05112126.7.
European Examination Report dated Mar. 3, 2008 in EP 05112131.7.
Heslop et al., "Word 2003 Bible", Wiley Publishing, 2003, pp. 441-443, Oct. 2003.
McKenzie et al., "XFA Template Version 1.0", http://www.w3.org/1999/05/XFA/xfa-template, retrieved on May 30, 2008, 60 pp.
Official Action in U.S. Appl. No. 10/955,612 dated Mar. 10, 2008.
Official Action in U.S. Appl. No. 11/030,423 dated Jul. 10, 2008.
Official Action in U.S. Appl. No. 11/066,083 dated Mar. 11, 2008.
Official Action in U.S. Appl. No. 11/065,754 dated Jun. 13, 2008.
Chinese First Office Action dated May 9, 2008 in 20050088514.8.
Souchon et al., "A Review of XML-compliant User-Interface Description Languages," LNCS, copyright Springer-Verlag 2003, pp. 377-391.
Meyer, "A Tool-Creating Validated XML Documents on the Fly Using MS Word," SIGDOC, copyright Oct. 2002, ACM, pp. 113-121.
Official Action in U.S. Appl. No. 10/955,612 dated May 18, 2007.
Official Action in U.S. Appl. No. 11/066,058 dated Oct. 1, 2008.
Official Action in U.S. Appl. No. 10/955,612 dated Dec. 3, 2008.
Official Action in U.S. Appl. No. 11/066,083 dated Dec. 9, 2008.
European Search Report dated Mar. 31, 2006 in EP 06100594.8.
Chinese First Office Action dated Jul. 4, 2008 in 200510128896.2.
Chinese First Office Action dated Aug. 29, 2008 in 200510128895.8.
Chinese Second Office Action dated Nov. 21, 2008 in 200510088514.8.
Official Action cited in U.S. Appl. No. 10/955,612 dated May 18, 2007.
Official Action cited in U.S. Appl. No. 11/066,083 dated Dec. 9, 2008.
Official Action cited in U.S. Appl. No. 11/065,754 dated Jan. 22, 2009.
European Search Report cited in European Application No. 06100594.8 dated Mar. 31, 2006.
Chinese First Office Action cited in Chinese Application No. 200510128896.2 dated Jul. 4, 2008.
Chinese Second Office Action cited in Chinese Application No. 200510088514.8 dated Nov. 21, 2008.
Chinese First Office Action cited in Chinese Application No. 200610007194.3 dated Nov. 7, 2008.
U.S. Official Action mailed Feb. 18, 2009, in U.S. Appl. No. 11/030,423.
European Official Communication dated May 13, 2009, in EP 05105427.8.
Narravula et al., "Supporting Strong Coherency for Active Caches in Multi-Tier Data-Centers over InfiniBand", ANL.gov, 2004, pp. 1-10 (retrieved from CiteseerX May 5, 2009).
Narravula et al., "Designing Efficient Cooperative Caching Schemes for Multi-Tier Data-Centers over RDMA-enabled Networks", OCU-CISRC-6/05-TR39, Jun. 2005, pp. cover page, 1-1.
Official Action in U.S. Appl. No. 11/065,754 dated Jul. 8, 2009.
Official Action in U.S. Appl. No. 10/955,612 dated Jun. 25, 2009.
Official Action in U.S. Appl. No. 11/331,586 dated May 12, 2009.
Chinese Third Office Action dated Jun. 5, 2009 in 200510088514.8.
Chinese First Office Action dated Jul. 24, 2009 in 200680033069.8.
Chinese First Office Action dated Aug. 28, 2009 in 200680033162.9.
Ladd et al., "Using HTLM, 4, XML and Java 1.2", Que, Platinum Edition, Dec. 1998, pp. 693-701.
Official Action in U.S. Appl. No. 11/331,586 dated Jul. 26, 2007.
Official Action in U.S. Appl. No. 11/332,468 dated Dec. 17, 2007.
Official Action in U.S. Appl. No. 11/331,586 dated Dec. 27, 2007.
Official Action in U.S. Appl. No. 11/332,468 dated Jul. 18, 2008.
Official Action in U.S. Appl. No. 11/331,586 dated Sep. 29, 2008.
Official Action in U.S. Appl. No. 11/332,468 dated Mar. 11, 2009.
Official Action in U.S. Appl. No. 11/066,058 dated Apr. 13, 2009.
PCT Search Report dated Jan. 16, 2007 in PCT/US2006/034802.
PCT Search Report dated Mar. 12, 2007 in PCT/US2006/034974.

* cited by examiner

DATA STORE FOR SOFTWARE APPLICATION DOCUMENTS

FIELD OF THE INVENTION

The present invention generally relates to managing data associated with computer-generated documents. More particularly, the present invention relates a data store for storing and relating data associated with computer-generated documents in a separate location from presentation data for a document's typical presentation format.

BACKGROUND OF THE INVENTION

With the advent of the computer age, computer and software users have grown accustomed to user-friendly software applications that help then write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

According to prior methods and systems, documents created by such applications (e.g. word processing documents, spreadsheets, slide presentation documents) have limited facility for storing/transporting the contents of arbitrary metadata required by the context of the documents. For example, a solution built on top of a word processing document may require the storage of workflow data that describes various states of the document, for example, previous workflow approval states (dates, times, names), current approval states, future workflow states before completion, name and office address of document author, document changes, and the like. According to such prior methods and systems, the options for storing this information were primarily limited to the use of document variables or existing custom object linking and embedding (OLE) document properties that have several limitations. For example, such prior methods can only store name/value pairs (no hierarchical data). Such methods are limited to 255 characters maximum. Such methods are built to contain only text. All properties for such methods are stored in a single store, for example, an OLE properties store, which means the properties have a possibility of conflicting. Further, such stored properties have no data validation because they are plain text. The result of these limitations is that it is difficult for users of such applications and related documents to store arbitrary data with documents, which is a common need of many users.

Another problem with prior methods and systems is that structured markup language data, for example Extensible Markup Language (XML) data may not be concurrently edited by multiple clients (for example, multiple add-ins each independently running in the context of a word processing document.) However, in the context of many documents, there is a higher likelihood that the scenarios involving this metadata will require concurrent editing by one or more sources.

Accordingly, there is a need for a data store for storing and relating data associated with a computer-generated document and for allowing use and manipulation of such data by one or more software applications. It is with respect to these and other considerations that the present invention has been made.

SUMMARY OF THE INVENTION

Embodiments of the invention solve the above and other problems by providing a data store within the document, yet separate in location (and possibly format) from the primary presentation storage location for storing, relating and for allowing use of data associated with a computer-generated document.

According to one aspect of the invention, data for structuring information associated with a document, such as document metadata, is maintained in a data store where relationships between different pieces of data are maintained. The data store exposes interfaces to the various pieces of data in the data store for allowing different applications to access and operate on one or more of the data pieces.

According to another aspect of the invention, the pieces of data are structured according to a markup language such as the Extensible Markup Language (XML). XML schemas may be associated with each piece of data, and the data store may validate the XML structure applied to the data based on an XML schema associated with a given piece of data. According to this aspect of the invention, documents may contain any number of arbitrary data items, for example metadata, structured according to the Extensible Markup Language (XML). Accordingly, document solution providers may store arbitrary metadata as XML with a given document and have that information automatically processed by a given solution having access to the data when the document is opened/edited/saved by a user.

According to another aspect of the invention programmatic access is provided to the data in its XML form while the document is being edited. Thus, a standard mechanism is provided that is familiar to solution developers via which the data may be accessed and modified programmatically while the document is open. This programmatic access mimics standard XML interfaces. Programmatic access to the data is provided via application programming interfaces to one or more editing client applications (for example, document editing or creating applications and/or third party application add-in solutions, and the like). According to this aspect, multiple client applications may access and edit the same piece of document data, and any conflicting changes to a given piece of data are resolved. "Side effects" to any given change may be made (for example, in response to setting a company name to "Microsoft," changing a stock symbol to "MSFT"). In addition, changes to data and any associated side effects may be "bundled" by the data store so that undoing one or more changes reverses all related changes. This removes the burden of development from the solution itself to ensure that it has reversed all changes when the user initiates an undo of the original change from the document surface, for example, by pressing an Undo command.

According to another aspect of the invention, standard XML schemas (XSDs) may be used to define the contents of any of the pieces of custom XML data associated with document metadata in order to ensure that XML data applied to the document data are valid. These schemas may be attached to any instance of XML data stored in the document, and the data store will disallow any change to the XML data that would result in the XML structure (that is, the XML tags as opposed to their contents) of that data from becoming invalid. This ensures that the solution developer can attach a specific piece of XML metadata to a document and ensure that the XML data will continue to be structurally "correct" according to the associated schema, regardless of which processes (for example, add-ins) are used to modify that data.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for storing and relating data associated with a computer-generated document and for efficiently allowing use and manipulation of data associated with a computer-generated document by one or more software applications. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
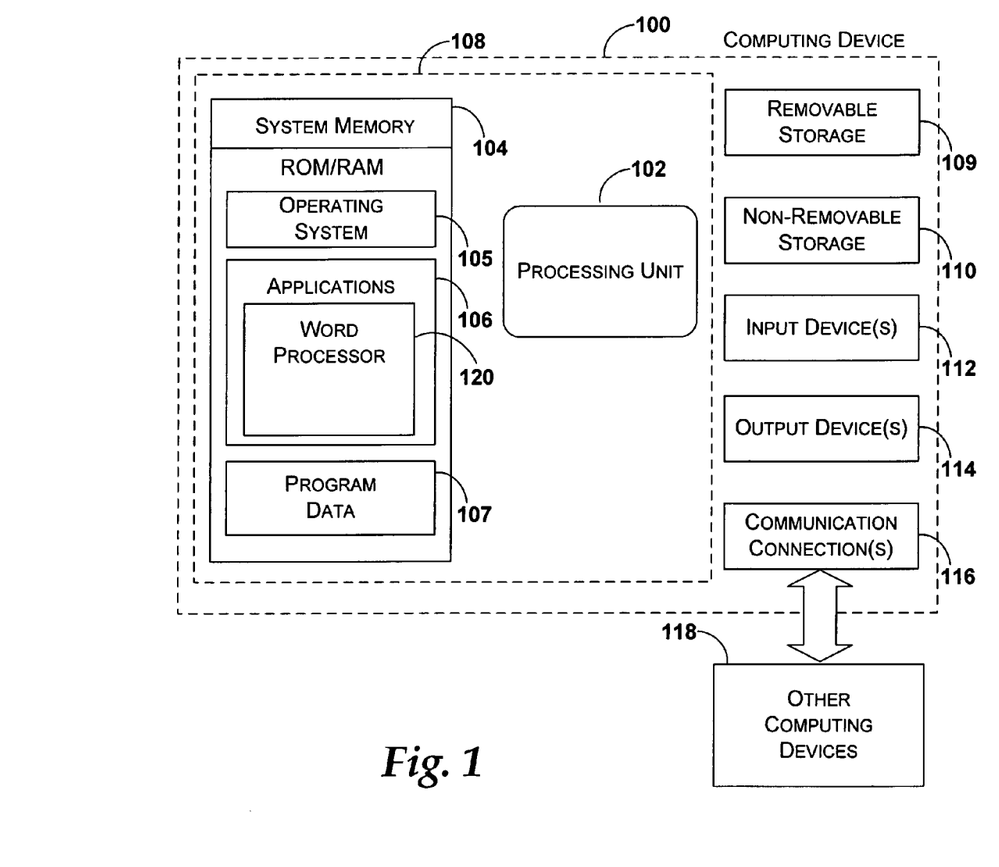
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word processor application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A number of program modules and data files may be stored in the system memory 104 of the computing device 100, including an operating system 105 suitable for controlling the operation of a networked personal computer, such as the WINDOWS operating systems from MICROSOFT Corporation of Redmond, Wash. System memory 104 may also store one or more program modules, such as word processor application 120, and others described below. Word processor application 120 is operative to provide functionality for creating, editing, and processing electronic documents.

According to one embodiment of the invention, the word processor application 120 comprises the WORD program from MICROSOFT Corporation. It should be appreciated, however, that word processor application programs from other manufacturers may be utilized to embody the various aspects of the present invention. It should further be appreciated that illustration of a word processing application is for purposes of example only and is not limiting of other types of applications that may produce and operate on documents according to the present invention. For example, other application programs 106 which are capable of processing various forms of content (e.g. text, images, pictures, etc.), such as spreadsheet application programs, database application programs, slide presentation application programs, drawing or computer-aided application programs, etc. are equally applicable to embodiments of the present invention. An example application program 106 that produces and operates on a variety of different types of documents includes OFFICE from MICROSOFT Corporation.

Embodiments of the invention may be implemented as a computer process, a computing system, or as an article of manufacture such as a computer program product or computer readable media. The computer program product may be a computer storage media readable by a computer system and encoding a computer program of instructions for executing a computer process.

Throughout the specification and claims, the following terms take the meanings associated herein, unless the context of the term dictates otherwise.

The term "data" may refer to document surface level or presentation level information such as words, sentences, paragraphs and the like, as well as, supplementary information, for example, metadata, which is carried with, referred to, or used by the word processing document. This information is often large and is likely not exposed on the presentation layer of the document.

The terms "markup language" or "ML" refer to a language for special codes within a document that specify how parts of the document are to be interpreted by an application. In a word processor file, the markup language specifies how the text is to be formatted or laid out.

The term "element" refers to the basic unit of an XML document. The element may contain attributes, other elements, text, and other content regions for an XML document.

The term "presentation" refers to the visible portion of the document—the text and layout that would appear if the document were printed.

The term "tag" refers to a character inserted in a document that delineates elements within an XML document. Each element can have no more than two tags: the start tag and the end tag. It is possible to have an empty element (with no content) in which case one tag is allowed.

The XML content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

"XPath" is an operator that uses a pattern expression to identify nodes in an XML document. An XPath pattern is a slash-separated list of child element names that describe a path through the XML document. The pattern "selects" elements that match the path.

The term "XML data store" refers to a container within a document, such as a word processor document, a spreadsheet document, a slide presentation document, etc., which provides access for storage and modification of the data (in XML format, for example) stored in the document while the file is open. Further definition of XML data store is provided below with respect to FIG. 2.

Figure 2:
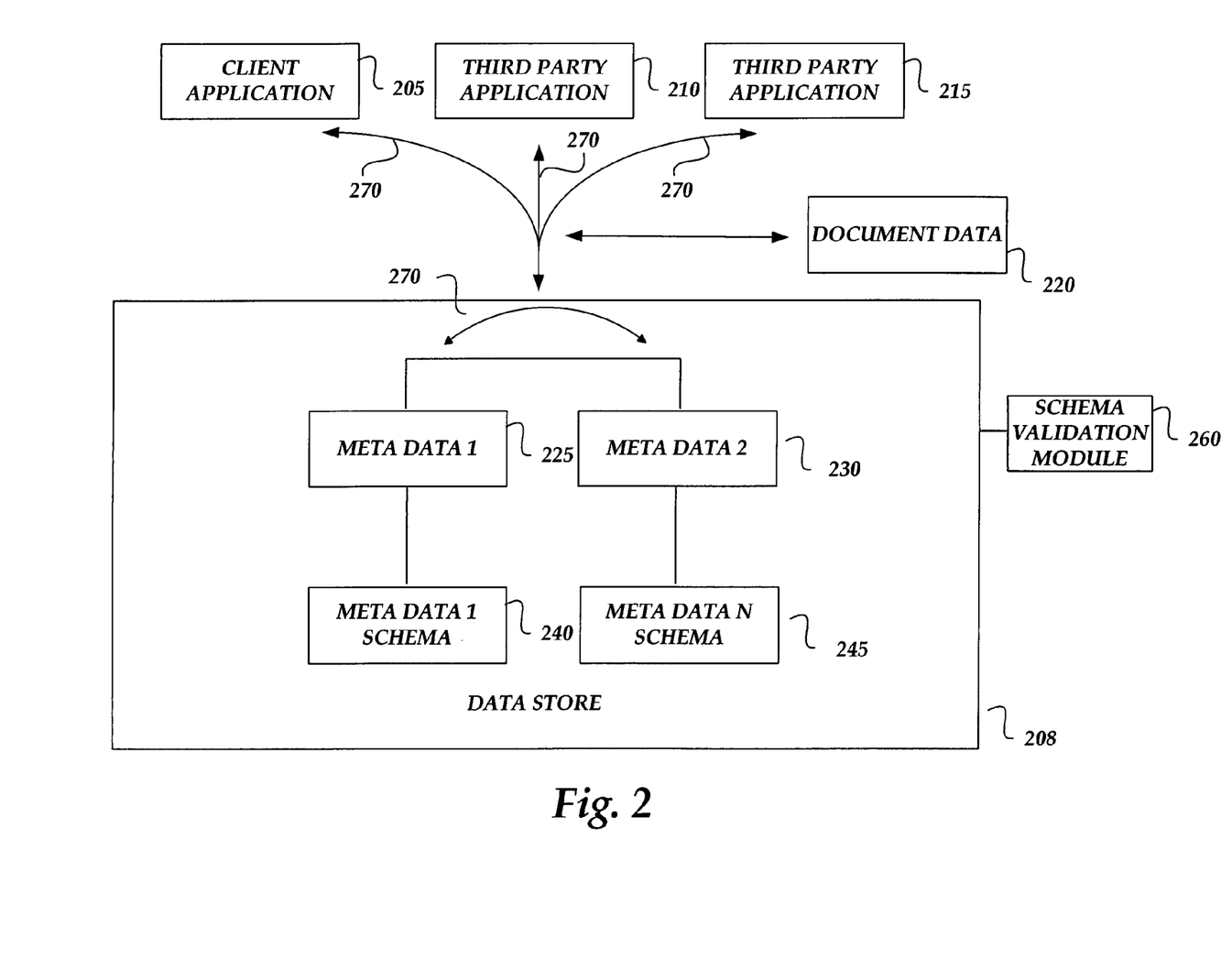
FIG. 2 is a block diagram illustrating a relationship between one or more client applications and a data store and the contents of the data store according to embodiments of the present invention.

FIG. 2 is a block diagram illustrating a relationship between one or more client applications and a data store and the contents of the data store according to embodiments of the present invention. Referring to FIG. 2, the document data 220 includes XML structure data and associated document data representing the surface or presentation level view of a document. For example the document data 220 may include XML structure (e.g., heading tags, body tags, conclusion tags) and associated surface view data (e.g., words, sentences, paragraphs) of a word processing document, spreadsheet document, slide presentation document, and the like.

The data store 208 is a document data repository for storing one or more pieces of structured data associated with one or more types of data associated with a given document. The metadata1 225 (structured data item) may include XML structure data and associated data for a first piece of metadata associated with the document. For example, the metadata1 225 may include XML structure data (e.g., date tags, name tags, etc.) applied to metadata listing the document author, date of document creation, date of document last change/save, and the like. The metadata2 230 (structured data item) may include XML structure data (tags) and associated metadata representing a second piece of metadata associated with the document. As should be understood, the metadata1 and metadata2 are for purposes of example and are not limiting of the variety and number of different types of data that may be maintained in the data store 208 in association with a given document. For example, as described herein, arbitrary data may be structured and added to the document by one or more software application as desired by solution providers or users having access to the document data.

Referring still to FIG. 2, a schema file 240, 245 may be attached to each piece of data stored in the data store 208 for dictating the syntax and validation rules associated with Extensible Markup Language (XML) data applied to each piece of data 225, 230. As known to those skilled in the art, XML schema files provide a way to describe and validate data in an XML environment. A schema file states what XML markup data, including elements and attributes, are used to describe content in an XML document, and the schema file defines XML markup syntax, including where each element is allowed, what types of content are allowed within an element and which elements can appear within other elements. The use of schema files ensures that the document (or individual piece of data in this case) is structured in a consistent and predictable manner. Schema files 240, 245 may be created by a user and generally supported by an associated markup language, such as XML.

This schematization of the document allows the data store to provide the ability to "guarantee" the structural validity of the document by rejecting any change that violates a given schema file at the data store level. According to an embodiment, the data store 208 utilizes a schema validation module 260 for validating XML structure added to or changes made to a given piece of data against an associated schema file. For example, if a document creator or editor makes XML structural changes to a given piece of data, for example, the metadata1, wherein the editor adds or removes a given XML tag, the data store 208 will utilize the schema validation module to check the XML structural changes against the associated schema file to ensure the validity of the change. If the change is not valid, an error can be generated to the editor. As is understood, such control of the XML structure applied to a given piece of data allows for structural consistency and predictability which is especially important for allowing client and third party applications to interact with associated data.

According to an embodiment of the invention, the data store 208 provides one or more application programming interfaces (API) 270 which can be accessed by client applications 205 (e.g., word processing applications, spreadsheet applications, slide presentation applications, etc.), as well as, third party applications 210, 215 via the object models (OM) of the respective applications 205, 210, 215. These interfaces allow client applications and third party applications to load any existing XML file into a given document's data store 208, thus ensuring that that data is now part of the document and will travel within that document for its lifetime (e.g., through opening/editing/saving/renaming/etc.) or until the data is deleted from the data store. According to one embodiment, the data in the data store is available in its XML format even when a source application for a given piece of data 225, 230 is closed or is otherwise not available. That is, a given piece of data 225, 230 may be accessed via the APIs 270 by other applications (other than a source application). As described below, the APIs also allow client and third party applications to make changes to the XML markup data applied to the data items 225, 230.

Once XML data 225, 230 is loaded into the data store for association with a document 220, it can be manipulated as standard XML using the data store interfaces designed to provide similar methods to existing XML editing interfaces in order to leverage developers' existing knowledge of the XML programming standard. This allows users to perform standard XML operations on XML data added to the data store for a document, such as adding elements and attributes, removing elements and attributes, changing the value of existing elements/attributes, and reading the values of any existing part of the associated XML tree. Using these XML standard operations, solutions may store structured complex metadata with a document subject to none of the previous restrictions on the length/size of the data or structure of the data, which enables the use of this XML data store for significantly more structured solutions than prior solutions. For example, a third party application 215 may be written for locating and extracting document author names and document creation dates from a number of documents 204 by reading the metadata1 225 added to the data store 208 for each document. The example third party application may be a spreadsheet application programmed for making a list of document author names and document creation dates for all documents created by a given organization. In accordance with embodiments of the present invention, the third party application may utilize the XML structure applied to the metadata1 for efficiently locating and extracting the desired data. For example, the third party application may be written to parse the XML structure of the metadata1 file to locate XML tags, such as <docauthor> and <doccreationdate> for obtaining and using data associated with those tags. As should be appreciated, the forgoing is just one example of the many ways one or more applications may interact with structured data that is associated with the document via the data store 208.

In addition, the data store 208 provides any number of API interfaces 270 to any individual piece of XML data 220, 225, 230 (also known as a store item) to enable multiple applications 205, 210, 215 to work with the same piece of data. For example, several solutions, such as a client application (e.g., word processing application) and third party application solutions (e.g., the example spreadsheet application described above), may work with the same set of document properties (e.g., properties contained in the metadata2 230 file). Using the data store 208, each of these applications receive separate access to the desired XML data 230 through their own data store API interface 270 for allowing each application to communicate with the data via its own OM without having to deal with the complexity of having multiple processes accessing the same piece of data.

In order to allow for these multiple applications 205, 210, 215 to access the same data, the data store 208 notifies each of these applications when any part of the XML data is changed by another application so that a given application may respond to that change (both internally to its own process and externally by other changes to the same data). When one application requests a change to a given data item, that request is automatically sent to all other applications to allow other applications to decide how or if to respond to the requested change. According to one embodiment, this is accomplished by allowing each application to register to "listen" to any part of the XML data to which it has an interface so that a given application solution/program only receives those messages which are pertinent to its own logic. For example, one type of application 210 may wish to register to listen to all changes made to a given XML data in order to provide detailed business logic capabilities to a third party solution, but another type of application 215 may wish to only listen to changes to one or two specific XML elements within the same data because its logic does not care about changes to any other part of the XML data.

According to this embodiment, the multiple applications 205, 210, 215 may access and edit the same piece of document data, and any conflicting changes to a given piece of data are resolved. For example, "side effects" to any given change may be made when one change by on application causes a side effect change by another application. For example, a first application 210 may be tasked with extracting company names from one or more data items 225, 230 associated with a given document for translating those names into corresponding stock symbols, if available, for compiling a list of company stock symbols related to a given document. If a second application 215 causes a given company name in a given piece of metadata to be added or to be changed, for example, changing a company name from "Company ABC" to Company XYZ," the first application may listen to this change for automatically updating its list of stock symbols to include the stock symbol for "Company XYZ" instead of "Company ABC." In addition, such changes and any associated side effects may be bundled by the data store 208 so that undoing one or more changes reverses all related changes.

As described herein, embodiments of the invention provide a data store for storing, relating and for allowing use of data associated with a computer-generated document. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for generating an accessible metadata store in a source document, the method comprising:

generating a source document on a source application, wherein the source document includes surface view data that is exposed on a presentation layer when the source document is rendered and metadata that is unexposed on the presentation layer when the source document is rendered;

structuring the metadata of the source document into a mark-up language (ML) document;

storing the ML document that includes the metadata of the source document in the metadata store separate from the surface view data of the source document, wherein the metadata store and the surface view data are stored in the source document;

attaching an ML schema file to the ML document that includes the metadata of the source document, wherein the ML schema file is stored in the metadata store of the source document;

exposing application programming interfaces (APIs) to the metadata store, wherein the APIs provide other applications having application types different than the source application access to the ML document that includes the metadata of the source document via object models of the other applications, wherein the exposed APIs for the metadata store permit the other applications to:

load the metadata, stored in the metadata store that is stored in the source document, independent of the surface view data, monitor modifications to the metadata, stored in the metadata store that is stored in the source document, independent of the surface view data, modify the metadata, stored in the metadata store that is stored in the source document, independent of the surface view data, when a modification of the metadata is received at the metadata store, receive a change notification from the metadata store of a modification to the metadata, stored in the metadata store that is stored in the source document, independent of the surface view data, and
undo modifications to the metadata, stored in the metadata store that is stored in the source document, independent of the surface view data.

2. The computer-implemented method of claim 1, wherein the ML document is an Extensible Mark-up Language (XML) document.

3. The computer-implemented method of claim 1, wherein structuring the metadata of the source document into a ML document includes structuring the metadata into a plurality of ML documents, wherein each of the plurality of ML documents includes a portion of the metadata of the source document.

4. The computer-implemented method of claim 1, wherein the ML document is validated by the ML schema file.

5. The computer-implemented method of claim 1, wherein the surface view data is stored in the source document in a separate data store from the metadata store.

6. The computer-implemented method of claim 1, wherein the exposed APIs permit other applications to simultaneously:
load the metadata, stored in the metadata store that is stored in the source document, independent of the surface view data,
monitor modifications to the metadata, stored in the metadata store that is stored in the source document, independent of the surface view data,
modify the metadata, stored in the metadata store that is stored in the source document, independent of the surface view data,
when a modification of the metadata is received at the metadata store receive a change notification from the metadata store of a modification to the metadata, stored in the metadata store that is stored in the source document, independent of the surface view data, and
undo modifications to the metadata, stored in the metadata store that is stored in the source document, independent of the surface view data.

7. A computer-readable storage medium having computer executable instructions for generating an accessible metadata store in a source document, the instructions comprising:
generating a source document on a source application, wherein the source document includes surface view data that is exposed on a presentation layer when the source document is rendered and metadata that is unexposed on the presentation layer when the source document is rendered;
structuring the metadata of the source document into a mark-up language (ML) document;
storing the ML document that includes the metadata of the source document in the metadata store separate from the surface view data of the source document, wherein the metadata store and the surface view data are stored in the source document;
attaching an ML schema file to the ML document that includes the metadata of the source document, wherein the ML schema file is stored in the metadata store of the source document;
exposing application programming interfaces (APIs) to the metadata store, wherein the APIs provide other applications having application types different than the source application access to the ML document that includes the metadata of the source document via object models of the other applications, wherein the exposed APIs for the metadata store permit the other applications to:
load the metadata, stored in the metadata store that is stored in the source document, independent of the surface view data,
monitor modifications to the metadata, stored in the metadata store that is stored in the source document, independent of the surface view data,
modify the metadata, stored in the metadata store that is stored in the source document, independent of the surface view data,
when a modification of the metadata is received at the metadata store, receive a change notification from the metadata store of a modification to the metadata, stored in the metadata store that is stored in the source document, independent of the surface view data, and
undo modifications to the metadata, stored in the metadata store that is stored in the source document, independent of the surface view data.

8. The computer-readable storage medium of claim 7, wherein the ML document is an Extensible Mark-up Language (XML) document.

9. The computer-readable storage medium of claim 7, wherein structuring the metadata of the source document into a ML document includes structuring the metadata into a plurality of ML documents, wherein each of the plurality of ML documents includes a portion of the metadata of the source document.

10. The computer-readable storage medium of claim 7, wherein the ML document is validated by the ML schema file.

11. The computer-readable storage medium of claim 7, wherein the surface view data is stored in the source document in a separate data store from the metadata store.

12. The computer-readable storage medium of claim 7, wherein the exposed APIs permit other applications to simultaneously:
load the metadata, stored in the metadata store that is stored in the source document, independent of the surface view data,
monitor modifications to the metadata, stored in the metadata store that is stored in the source document, independent of the surface view data,
modify the metadata, stored in the metadata store that is stored in the source document, independent of the surface view data,
when a modification of the metadata is received at the metadata store, receive a change notification from the metadata store of a modification to the metadata, stored in the metadata store that is stored in the source document, independent of the surface view data, and
undo modifications to the metadata, stored in the metadata store that is stored in the source document, independent of the surface view data.

13. A system for generating an accessible metadata store in a source document, the system comprising:
a processor; and
a memory having computer-executable instructions stored thereon, wherein the computer executable instructions are configured for:
generating a source document on a source application, wherein the source document includes surface view data that is exposed on a presentation layer when the source document is rendered and metadata that is unexposed on the presentation layer when the source document is rendered;
structuring the metadata of the source document into a mark-up language (ML) document;
storing the ML document that includes the metadata of the source document in the metadata store separate from the surface view data of the source document, wherein the metadata store and the surface view data are stored in the source document;

attaching an ML schema file to the ML document that includes the metadata of the source document, wherein the ML schema file is stored in the metadata store of the source document;

exposing application programming interfaces (APIs) to the metadata store, wherein the APIs provide other applications having application types different than the source application access to the ML document that includes the metadata of the source document via object models of the other applications, wherein the exposed APIs for the metadata store permit the other applications to:

load the metadata, stored in the metadata store that is stored in the source document, independent of the surface view data, monitor modifications to the metadata, stored in the metadata store that is stored in the source document, independent of the surface view data, modify the metadata, stored in the metadata store that is stored in the source document, independent of the surface view data, when a modification of the metadata is received at the metadata store, receive a change notification from the metadata store of a modification to the metadata, stored in the metadata store that is stored in the source document, independent of the surface view data, and undo modifications to the metadata, stored in the metadata store that is stored in the source document, independent of the surface view data.

14. The system of claim 13, wherein the ML document is an Extensible Mark-up Language (XML) document.

15. The system of claim 13, wherein structuring the metadata of the source document into a ML document includes structuring the metadata into a plurality of ML documents, wherein each of the plurality of ML documents includes a portion of the metadata of the source document.

16. The system of claim 13, wherein the ML document is validated by the ML schema file.

17. The system of claim 13, wherein the surface view data is stored in the source document in a separate data store from the metadata store.

18. The system of claim 13, wherein the exposed APIs permit other applications to simultaneously:

load the metadata, stored in the metadata store that is stored in the source document, independent of the surface view data, monitor modifications to the metadata, stored in the metadata store that is stored in the source document, independent of the surface view data, modify the metadata, stored in the metadata store that is stored in the source document, independent of the surface view data, when a modification of the metadata is received at the metadata store, receive a change notification from the metadata store of a modification to the metadata, stored in the metadata store that is stored in the source document, independent of the surface view data, and undo modifications to the metadata, stored in the metadata store that is stored in the source document, independent of the surface view data.

* * * * *

UNITED STATES PATENT AND TRADEMARK OFFICE
CERTIFICATE OF CORRECTION

| | | |
|---|---|---|
| PATENT NO. | : 7,668,873 B2 | Page 1 of 1 |
| APPLICATION NO. | : 11/066117 | |
| DATED | : February 23, 2010 | |
| INVENTOR(S) | : Tristan A. Davis et al. | |

It is certified that error appears in the above-identified patent and that said Letters Patent is hereby corrected as shown below:

In column 9, line 33, in Claim 6, before "receive" delete "store" and insert -- store, --, therefor.

Signed and Sealed this
First Day of February, 2011

David J. Kappos
*Director of the United States Patent and Trademark Office*